United States Patent
Arora et al.

(10) Patent No.: US 11,956,359 B2
(45) Date of Patent: Apr. 9, 2024

(54) PRIVACY PRESERVING IDENTITY DATA EXCHANGE BASED ON HYBRID ENCRYPTION

(71) Applicant: Visa International Service Association, San Francisco, CA (US)

(72) Inventors: Sunpreet Singh Arora, San Jose, CA (US); Saikrishna Badrinarayanan, Fremont, CA (US); Srinivasan Raghuraman, Cambridge, MA (US); Kim Wagner, Sunnyvale, CA (US); Gaven Watson, Palo Alto, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/264,684

(22) PCT Filed: Feb. 10, 2022

(86) PCT No.: PCT/US2022/015949
§ 371 (c)(1),
(2) Date: Aug. 8, 2023

(87) PCT Pub. No.: WO2022/173930
PCT Pub. Date: Aug. 18, 2022

(65) Prior Publication Data
US 2024/0039719 A1    Feb. 1, 2024

Related U.S. Application Data

(60) Provisional application No. 63/149,125, filed on Feb. 12, 2021.

(51) Int. Cl.
*H04L 9/14* (2006.01)
*H04L 9/06* (2006.01)

(52) U.S. Cl.
CPC ............. *H04L 9/14* (2013.01); *H04L 9/065* (2013.01)

(58) Field of Classification Search
CPC ................... H04L 9/14; H04L 9/065
See application file for complete search history.

(56) References Cited

U.S. PATENT DOCUMENTS

| 8,538,890 B2 | 9/2013 | Medvinsky |
| 11,128,482 B2 * | 9/2021 | Asanghanwa ........ G06F 21/121 |

(Continued)

FOREIGN PATENT DOCUMENTS

| EP | 3353943 A1 | 8/2018 |
| EP | 3908923 A1 | 11/2021 |

(Continued)

OTHER PUBLICATIONS

PCT/US2022/015949, "International Search Report and Written Opinion", dated May 30, 2022, 9 pages.

(Continued)

*Primary Examiner* — Yonas A Bayou
(74) *Attorney, Agent, or Firm* — Kilpatrick Townsend & Stockton LLP (57) ABSTRACT

A method is disclosed. The method includes receiving, by a processing network computer from a relying party computer associated with a relying party, a request for data associated with a user operating a user device. The processing network computer may retrieve first encrypted data of the user having a user-layer of encryption. The processing computer can then generate a second symmetric key to add a relying party-layer of encryption to the first encrypted data using a stream cipher. The doubly encrypted data may be transmitted to a user device that removes the user-layer of encryption on the first doubly encrypted data, and then adds a second relying party-layer of encryption to form second doubly (Continued)

encrypted data. The second doubly encrypted data may be transmitted to the relying party computer, which can remove both relying party-layers of encryption to gain access to the data associated with the user.

20 Claims, 5 Drawing Sheets

(56) References Cited

U.S. PATENT DOCUMENTS

| | | | |
|---|---|---|---|
| 11,295,024 B2* | 4/2022 | Bursell | H04L 9/3239 |
| 11,296,870 B2* | 4/2022 | Hohner | H04L 9/0822 |
| 11,316,660 B2* | 4/2022 | Simon | H04L 63/0442 |
| 11,341,270 B2* | 5/2022 | Reeve | G06F 21/6254 |
| 11,444,755 B2* | 9/2022 | Christensen | H04L 9/3255 |
| 11,451,380 B2* | 9/2022 | Bursell | H04L 9/14 |
| 2010/0058047 A1 | 3/2010 | Medvinsky | |
| 2018/0013728 A1* | 1/2018 | Carlson | H04L 63/0435 |
| 2018/0331824 A1* | 11/2018 | Racz | H04L 9/0825 |
| 2020/0136824 A1* | 4/2020 | Allen | H04L 9/30 |
| 2020/0162252 A1* | 5/2020 | Davis | H04L 9/0872 |
| 2022/0129443 A1* | 4/2022 | Nadeau | G06F 21/64 |

FOREIGN PATENT DOCUMENTS

| | | |
|---|---|---|
| WO | 2007043014 A1 | 4/2007 |
| WO | 2020146602 A1 | 7/2020 |

OTHER PUBLICATIONS

"Pair-wise Cryptographic Models for Secure Data Exchange in P2P Database Management Systems" by Sk. Md. Mizanur et al., 14 pages, at https://eprint.iacr.org/2010/085.pdf (2010).

"PKI in Government Identity Management Systems," by Ali M. Al-Khouri, *International Journal of Network Security & Its Applications* 3(3), 25 pages (2011).

* cited by examiner

PRIVACY PRESERVING IDENTITY DATA EXCHANGE BASED ON HYBRID ENCRYPTION

CROSS-REFERENCES TO RELATED APPLICATIONS

This application is a National Stage of International Application No. PCT/US2022/015949, filed on Feb. 10, 2022, which claims priority to U.S. Provisional Patent No. 63/149,125, filed on Feb. 12, 2021, the entirety of which are incorporated by reference herein.

BACKGROUND

Interactions performed between a user and a relying party may require the user to give access to sensitive data to the relying party. In some processes, commutative encryption techniques can allow for the transmission of sensitive data between the user and the relying party. A commutative encryption is a kind of an encryption system that enables a plaintext to be encrypted more than once using different users' public keys. In this system, decryption is not required before the encryption/re-encryption processes. Moreover, the resulted ciphertext can be decrypted by the designated decryption entities without considering the order of public keys used in the encryption/re-encryption processes. A naïve construction of a commutative encryption would be an application of the RSA (Rivest, Shamir, and Adleman) cryptosystem. However, this would introduce security issues as it means that each one of the two parties can know the prime factoring of each other's modulus, potentially allowing for a malicious party to take advantage. Other, non-standard commutative encryption techniques exist, but are not widely implemented and would require many changes in current systems.

Embodiments of the disclosure address this problem and other problems individually and collectively.

SUMMARY

A method is disclosed. The method comprises: receiving, by a processing network computer from a relying party computer associated with a relying party, a request for data associated with a user operating a user device, and a public encryption key associated with the relying party; generating, by a processing network computer, a second symmetric key; encrypting, by the processing network computer, the second symmetric key with the public encryption key associated with the relying party to form an encrypted second symmetric key; encrypting, by the processing network computer, first encrypted data associated with the user with a second keystream to form first doubly encrypted data, wherein the second keystream is generated using a keystream generation function with the second symmetric key and a second nonce as input, wherein the first encrypted data associated with the user comprises plaintext data associated with the user, and wherein the plaintext data associated with the user is encrypted with a first keystream that is generated using the keystream generation function with a first symmetric key and a first nonce as input; transmitting, by the processing network computer to the user device, an encrypted first symmetric key, the first nonce, the first doubly encrypted data, and the public encryption key associated with the relying party; receiving, by the processing network computer from the user device, an encrypted third symmetric key, a third nonce, and second doubly encrypted data, wherein the second doubly encrypted data was formed by encrypting second encrypted data associated with the user with a third keystream that is generated using the keystream generation function with a third symmetric key and the third nonce as input; and transmitting, by the processing network computer to the relying party computer, the encrypted second symmetric key, the encrypted third symmetric key, the second nonce, the third nonce, and the second doubly encrypted data, wherein after the relying party computer receives the encrypted second symmetric key, the encrypted third symmetric key, the second nonce, the third nonce, and the second doubly encrypted data from the processing network computer, the relying party computer: decrypts the encrypted second symmetric key and the encrypted third symmetric key to obtain the second symmetric key and the third symmetric key; and decrypts the second doubly encrypted data using the second symmetric key, the second nonce, the third symmetric key, and the third nonce to obtain the plaintext data associated with the user.

Another method is disclosed. The method comprises: receiving, by a user device operated by a user from a processing network computer, an encrypted first symmetric key, a first nonce, first doubly encrypted data, and a public encryption key associated with a relying party; decrypting, by the user device, the encrypted first symmetric key using a secret encrypted key associated with the user device to obtain a first symmetric key; decrypting, by the user device, the first doubly encrypted data using the first symmetric key and the first nonce to obtain second encrypted data associated with the user; generating, by the user device, a third symmetric key; encrypting, by the user device, the third symmetric key using the public encryption key associated with the relying party to form an encrypted third symmetric key; encrypting, by the user device, the second encrypted data associated with the user with a third keystream to form second doubly encrypted data, wherein the third keystream is generated using a keystream generation function with the third symmetric key and a third nonce; and transmitting, by the user device to the processing network computer, the encrypted third symmetric key, the third nonce, and the second doubly encrypted data, wherein the processing network computer: transmits, to a relying party computer operated by the relying party, an encrypted second symmetric key, the encrypted third symmetric key, a second nonce, the third nonce, and the second doubly encrypted data, wherein the relying party computer: decrypts the encrypted second symmetric key and the encrypted third symmetric key to obtain a second symmetric key and the third symmetric key; and decrypts the second doubly encrypted data using the second symmetric key, the second nonce, the third symmetric key, and the third nonce to obtain plaintext data associated with the user.

Yet another method is disclosed. The method comprises: transmitting, by a relying party computer operated by a relying party to a processing network computer, a request for data associated with a user operating a user device, and a public encryption key associated with the relying party, wherein the processing network computer: generates a second symmetric key; encrypts the second symmetric key with the public encryption key associated with the relying party to form an encrypted second symmetric key; encrypts first encrypted data associated with the user with a second keystream to form first doubly encrypted data, wherein the second keystream is generated using a keystream generation function with the second symmetric key and a second nonce as input, wherein the first encrypted data associated with the user comprises plaintext data associated with the user, and wherein the plaintext data associated with the user is encrypted with a first keystream that is generated using the keystream generation function with a first symmetric key and a first nonce as input; transmits, to the user device, an encrypted first symmetric key, the first nonce, the first doubly encrypted data, and the public encryption key associated with the relying party; and receives, from the user device, an encrypted third symmetric key, a third nonce, and second doubly encrypted data, wherein the second doubly encrypted data was formed by encrypting second encrypted data associated with the user with a third keystream that is generated using the keystream generation function with a third symmetric key and the third nonce as input; receiving, by the relying party computer from the processing network computer, the encrypted second symmetric key, the encrypted third symmetric key, the second nonce, the third nonce, and the second doubly encrypted data; decrypting, by the relying party computer, the encrypted second symmetric key and the encrypted third symmetric key to obtain the second symmetric key and the third symmetric key; and decrypting, by the relying party computer, the second doubly encrypted data using the second symmetric key, the second nonce, the third symmetric key, and the third nonce to obtain the plaintext data associated with the user.

Other embodiments can relate to machines (e.g., computers, devices, or systems) that are programmed or configured to perform the above methods.

A better understanding of the nature and advantages of embodiments of the present invention may be gained with reference to the following detailed description and accompanying drawings.

DETAILED DESCRIPTION

Prior to discussing embodiments of the disclosure, some terms can be described in further detail.

A "user" may include an individual. In some embodiments, a user may be associated with one or more personal accounts and/or mobile devices.

A "user device" may be a device that is operated by a user. Examples of user devices may include a mobile phone, a smart phone, a card, a personal digital assistant (PDA), a laptop computer, a desktop computer, a server computer, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "resource provider" can be any suitable entity that provides resources (e.g., goods, services, access to secure data, access to locations, or the like) to another entity. For example, a resource providing entity can be a merchant, a venue operator, a building owner, a governmental entity, etc. A "merchant" may typically be an entity that engages in transactions and can sell goods or services, or provide access to goods or services.

An "issuer" may refer to a business entity (e.g., a bank) that issues and optionally maintains an account for a user. An issuer may also issue payment credentials stored on a user device, such as a cellular telephone, smart card, tablet, or laptop to the consumer.

"Personal data" may be data that is associated with a specific user. Personal data of a user may provide information of the user or things of the user. Examples of personal data may be the name of the user, the birthdate of the user, contact information (e.g., email addresses, phone numbers, IP addresses, etc.) of the user, the home address of the user, account numbers of accounts associated the user (e.g., bank account numbers, student ID numbers, etc.), etc. In some embodiments, personal data may refer to attestations of raw personal data. For example, personal data may be a data of birth such as Jan. 1, 1970, but an attestation saying "USER IS ABOVE 21 YEARS OLD" may also be referred to as personal data.

A "key" may include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public encryption key" may include an encryption key that may be shared openly and publicly. The public encryption key may be designed to be shared and may be configured such that any information encrypted with the public encryption key may only be decrypted using a secret encryption key associated with the public encryption key (i.e., a public/secret encryption key pair).

A "secret encryption key" may include any encryption key that may be protected and secure. A secret encryption key may be securely stored at an entity and may be used to decrypt any information that has been encrypted with an associated public encryption key of a public/secret encryption key pair associated with the secret encryption key.

A "public/secret encryption key pair" may refer to a pair of linked cryptographic keys generated by an entity. The public encryption key may be used for public functions such as encrypting a message to send to the entity or for verifying a digital signature which was supposedly made by the entity. The secret encryption key, on the other hand may be used for private functions such as decrypting a received message or applying a digital signature. In some embodiments, the public encryption key may be authorized by a body known as a Certification Authority (CA) which stores the public encryption key in a database and distributes it to any other entity which requests it. The secret encryption key can typically be kept in a secure storage medium and will usually only be known to the entity. Public and secret encryption keys may be in any suitable format, including those based on Rivest-Shamir-Adleman (RSA) or elliptic curve cryptography (ECC).

A "stream cipher" can be a symmetric key cipher where plaintext digits are combined with a pseudorandom cipher digit stream (keystream). In some embodiments, the stream cipher may include an underlying keystream generation function which takes a cryptographic key and a nonce as input to output a keystream. The resultant keystream can be used to encrypt data by operating on the plaintext data with an exclusive or operation (XOR) using the keystream. For example, a cryptographic key and a nonce can be input into a keystream generation function that produces a keystream, [11001101], as output. Plaintext data, [00101000], can be encrypted with the keystream by XOR-ing the plaintext data and the keystream together to retrieve encrypted data, [11100101]. Examples of stream ciphers can include RC4, Salsa, counter mode block counters, etc.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Figure 1:
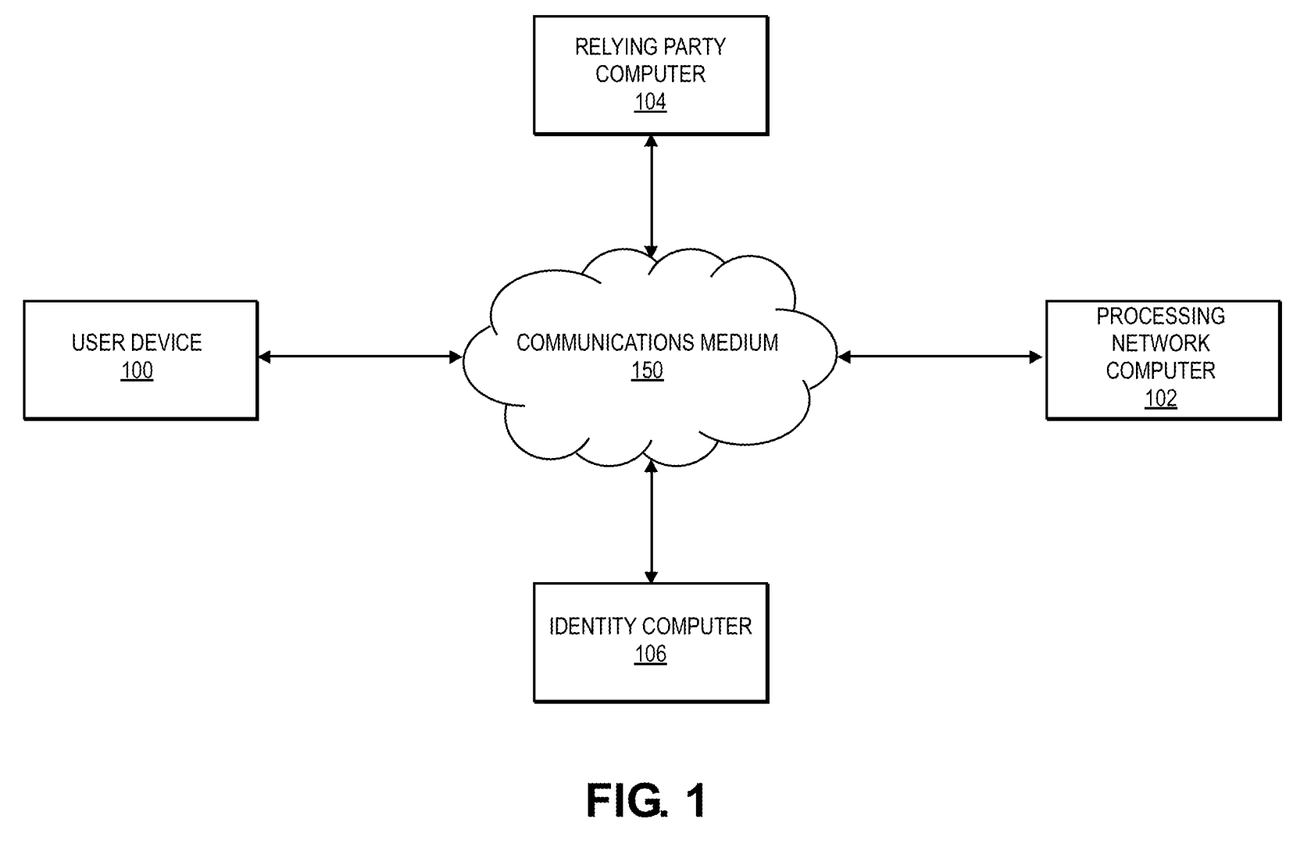
FIG. 1 shows a block diagram of an identity data system according to embodiments.

FIG. 1 shows a block diagram of an identity data system according to embodiments. The identity data system comprises a user device 100, a processing network computer 102, a relying party computer 104, and an identity computer 106. The user device 100 may be operated by a user (not shown). The processing network computer 102 may be in a processing network (e.g., a payment processing network) operated by a payment processing organization. The relying party computer 104 may be operated by a relying party such as a resource provider (e.g., a merchant, a library, etc.). The identity computer 106 may be operated by an identity provider (e.g., a governmental entity, an educational institution, an issuer, etc.).

Each of the components in the identity data system of FIG. 1 can be associated with a public encryption key and a secret encryption key of a public-key encryption scheme (e.g., RSA, ElGamal, ECDSA, etc.). The encryption of some key K to form an encrypted key ENC(K) can be denoted by PKE.E(PK, K)=ENC(K), where PK is a public encryption key. The decryption of some encrypted data ENC(K) to obtain unencrypted symmetric key K can be denoted by PKE.D(DK, ENC(K))=K, where DK is a secret decryption key. The user device 100 can be associated with a public encryption key associated with the user, $pk_U$, and a secret encryption key associated with the user, $sk_U$. Similarly, the relying party computer 104 can be associated with a public encryption key associated with the relying party, $pk_R$, and a secret encryption key associated with the relying party, $sk_R$.

The components in the identity data system of FIG. 1 and any of the following figures can be in operative communication with each other through any suitable communications medium 150. Suitable examples of the communications medium 150 may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices of FIG. 1 may be transmitted using a secure communications protocols such as, but not limited to Secure Hypertext Transfer Protocol (HTTPS).

The user device 100 may communicate with the identity computer 106 to provision personal data to an identity account maintained by the processing network computer 102. The user device 100 may transmit a provisioning request for personal data of the user operating the user device 100 to be provisioned to the identity account. For example, the user device 100 can generate a provisioning request for the identity computer 106 to provision plaintext data associated with the user, M, (e.g., personal data such as a full name of the user, a birthdate of the user, an account number associated with the user, a home address of the user, etc.) to the identity account at the processing network computer 102.

Upon receiving the provisioning request, the identity computer 106 may generate a first symmetric key, $K_1$. The identity computer 106 may encrypt the first symmetric key, $K_1$, using the public encryption key associated with the user, $pk_U$, to form an encrypted first symmetric key, $KEM_U$=PKE.E($pk_U$, $K_1$). The identity computer 106 may then retrieve the plaintext data associated with the user, M. In some embodiments, the plaintext data associated with the user, M, may additionally include a digital signature (e.g., a digital signature signed a secret encryption key of a public/secret encryption key pair associated with the identity computer 106) on the plaintext data associated with the user, M. The addition of a digital signature on the plaintext data can be used to ensure the integrity of the plaintext data being encrypted. The identity computer 106 may then generate a first nonce, $N_1$. The first nonce, $N_1$, may be generated using a random or pseudo-random number generator. The identity computer 106 may then use a keystream generation function, F, of a stream cipher with the first symmetric key, $K_1$, as input to generate a first keystream, $F(K_1, N_1)$ to encrypt the personal data, M. For example, the first keystream, $F(K_1, N_1)$, can be used to encrypt the personal data, M, using an exclusive-OR (XOR) to form first encrypted data associated with the user, $C_U = M \oplus F(K_1, N_1)$. The identity computer 106 may complete the provisioning request by transmitting the encrypted first symmetric key, $KEM_U$, the first nonce, $N_1$, and the first encrypted data associated with the user, $C_U$, to the processing network computer 102.

Figure 2:
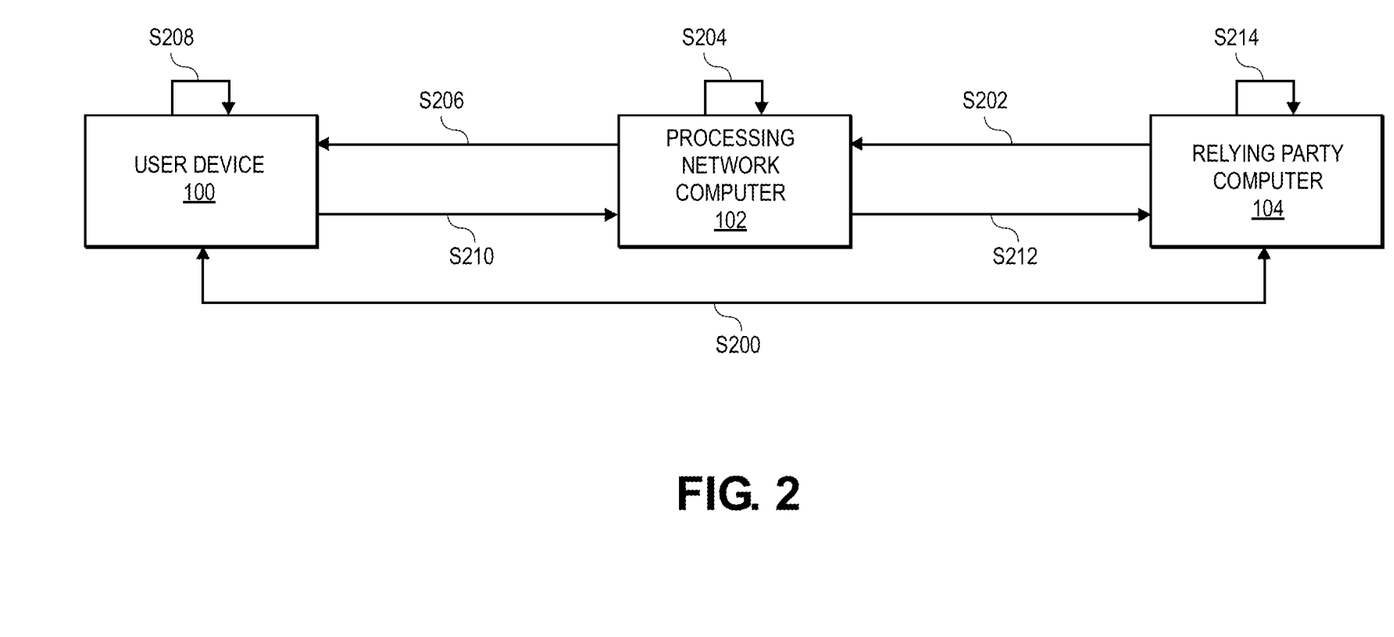
FIG. 2 shows a block diagram an identity data system and an overlaid secure data exchange method using a hybrid encryption scheme according to embodiments.

FIG. 2 shows a block diagram an identity data system and an overlaid secure data exchange method using a hybrid encryption scheme according to embodiments. After the processing network computer 102 receives the encrypted first symmetric key, $KEM_U$, the first nonce, $N_1$, and the first encrypted data associated with the user, $C_U$, from the identity computer 106, the user operating the user device 100 can initiate the secure data exchange to complete an interaction with the relying party operating the relying party computer 104. To complete the interaction, the user may wish to transmit the plaintext data associated with the user, M, to the relying party computer 104. For example, the interaction may include the user borrowing books from a library. The library may request that the user transmit their home address and account number (e.g., a library card number) to the relying party computer 104 operated by the library so that the library can lend the user the books. Another example interaction can include the user purchasing restricted goods such as alcohol from a merchant. The merchant may request that the user transmit their date of birth to the relying party computer 104 operated by the merchant so that the merchant can verify the age of the user.

In step S200, the user device 100 may initiate the secure data exchange the relying party computer 104. For example, the relying party computer 104 may detect that the user device 100 is in close proximity and prompt the user device 100 to transmit (e.g., via Bluetooth, NFC, etc.) the plaintext data associated with the user, M. Another example can include the user device 100 accessing a webpage maintained by the relying party computer 104. The user device 100 may indicate to the relying party computer 104 that the user operating the user device 100 has an identity account at the processing network computer 102, and may transmit a user identifier (e.g., a full name of the user, a phone number of the user, an email of the user, an identity account number of the user, etc.) to the relying party computer 104.

In step S202, after receiving the user identifier from the user device 100, the relying party computer 104 may transmit an identity request comprising the user identifier, an indication of the plaintext data or the type of plaintext data of the user (e.g., "HOME ADDRESS" and "ACCOUNT NUMBER"), and the public encryption key associated with the relying party, $pk_R$, to the processing network computer 102.

In step S204, after receiving the identity request from the relying party computer 104, the processing network computer 102 may generate a second symmetric key, $K_2$. The processing network computer 102 may then encrypt the second symmetric key, $K_2$, using the public encryption key associated with the relying party, $pk_R$, in the identity request to form an encrypted second symmetric key, $KEM_{R\_2}=PKE.E(pk_R, K_2)$. The processing network computer 102 may then generate a second nonce, $N_2$, using a random or pseudo-random number generator. After generating the second nonce, $N_2$, the processing network computer 102 may then generate a second keystream, $F(K_2, N_2)$, using the keystream generation function, F, with the second symmetric key, $K_2$, and the second nonce, $N_2$, as input to the keystream generation function. The processing network computer 102 may retrieve the first encrypted data associated with the user, $C_U$, as identified by the user identifier. The processing network computer 102 may then use the second keystream, $F(K_2, N_2)$, to encrypt the first encrypted data associated with the user, $C_U$, to form first doubly encrypted data, $C_{UR}=C_U \oplus F(K_2, N_2)$.

In step S206, after forming the first doubly encrypted data, $C_{UR}$, the processing network computer 102 may transmit the encrypted first symmetric key, $KEM_U$, the first nonce, $N_1$, the first doubly encrypted data, $C_{UR}$, and the public encryption key associated with the relying party, $p_{KR}$, to the user device 100.

In step S208, after receiving the encrypted first symmetric key, $KEM_U$, the first nonce, $N_1$, the first doubly encrypted data, $C_{UR}$, and the public encryption key associated with the relying party, $p_{KR}$, the user device 100 may decrypt the encrypted first symmetric key, $KEM_U$, using the secret encryption key associated with the user device, $sk_U$, to obtain the first symmetric key, $K_1=PKE.D(sk_U, KEM_U)$. The user device 100 may then decrypt a user-layer of encryption from the first doubly encrypted data, $C_{UR}$, using the first symmetric key, $K_1$, and the first nonce, $N_1$, to obtain second encrypted data associated with the user, $C_R=C_{UR}\oplus F(K_1, N_1)$. Note that expanding the right-hand side of the expression for $C_R$ results in $C_{UR}\oplus F(K_1, N_1)=C_U\oplus F(K_2, N_2)\oplus F(K_1, N_1)=M\oplus F(K_1, N_1)\oplus F(K_2, N_2)\oplus F(K_1, N_1)=M\oplus F(K_2, N_2)=C_R$.

The user device 100 may then generate a third symmetric key, $K_3$. The user device 100 may then encrypt the third symmetric key, $K_3$, using the public encryption key associated with the relying party, $pk_R$, received from the processing network computer 102 to form an encrypted third symmetric key, $KEM_{R\_3}=PKE.E(pk_R, K_3)$. The user device 100 may then generate a third nonce, $N_3$, using a random or pseudo-random number generator. After generating the third nonce, $N_3$, the user device 100 may then generate a third keystream, $F(K_3, N_3)$, using the keystream generation function, F, with the third symmetric key, $K_3$, and the third nonce, $N_3$, as input to the keystream generation function. The user device 100 may then use the third keystream, $F(K_3, N_3)$, to encrypt the second encrypted data associated with the user, $C_R$, to form second doubly encrypted data, $C_{RR}=C_R\oplus F(K_3, N_3)$.

In step S210, after forming the second doubly encrypted data, $C_{RR}$, the user device 100 may transmit the encrypted third symmetric key, $KEM_{R\_3}$, the third nonce, $N_3$, and the second doubly encrypted data, $C_{RR}$, to the processing network computer 102.

In step S212, after receiving the encrypted third symmetric key, $KEM_{R\_3}$, the third nonce, $N_3$, and the second doubly encrypted, $C_{RR}$, from the user device 100, the processing network computer 102 may transmit the encrypted second symmetric key, $KEM_{R\_2}$, the encrypted third symmetric key, $KEM_{R\_3}$, the second nonce, $N_2$, the third nonce, $N_3$, and the second doubly encrypted data, $C_{RR}$, to the relying party computer 104.

In step S214, after receiving the encrypted second symmetric key, $KEM_{R\_2}$, the encrypted third symmetric key, $KEM_{R\_3}$, the second nonce, $N_2$, the third nonce, $N_3$, and the second doubly encrypted data, $C_{RR}$, from the processing network computer 102, the relying party computer 104 may decrypt the encrypted second symmetric key, $KEM_{R\_2}$, using the secret encryption key associated with the relying party, $sk_R$, to obtain the second symmetric key, $K_2=PKE.D(sk_R, KEM_{R\_2})$. The relying party computer 104 may then decrypt the encrypted third symmetric key, $KEM_{R\_3}$, using the secret encryption key associated with the relying party, $sk_R$, to obtain the third symmetric key, $K_3=PKE.D(sk_R, KEM_{R\_3})$. The relying party computer 104 may then decrypt the second doubly encrypted data, $C_{RR}$, using the second symmetric key, $K_2$, the second nonce, $N_2$, the third symmetric key, $K_3$, and the third nonce, $N_3$, to obtain the plaintext data associated with the user, $M=C_{RR}\oplus F(K_2, N_2)\oplus F(K_3, N_3)$. Note that expanding right-hand side of the expression for M results in $C_{RR}\oplus F(K_2, N_2)\oplus F(K_3, N_3)=C_R\oplus F(K_3, N_3)\oplus F(K_2, N_2)\oplus F(K_3, N_3)=C_R\oplus F(K_2, N_2)=M\oplus F(K_2, N_2)\oplus F(K_2, N_2)=M$. The relying party computer 104 may then use the plaintext data associated with the user, M, to complete the interaction. For example, the relying party computer 104 may verify the user holds a library account using a library account number in the plaintext data associated with the user, M, or the relying party computer 104 may verify the age of the user to authorize the purchase of alcohol. In some embodiments, when the plaintext data includes a digital signature, the relying party computer 104 can verify the digital signature by using the public encryption key of the public/secret encryption key pair associated with the identity computer 106 to ensure the integrity of the plaintext data associated with the user, M.

Figure 3:
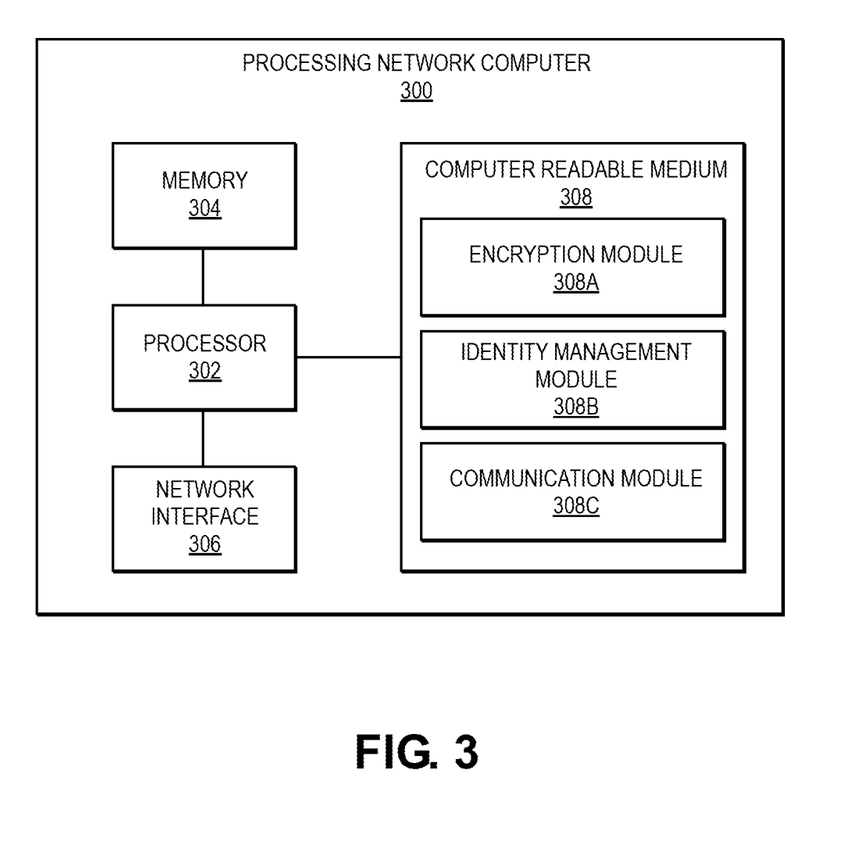
FIG. 3 shows a block diagram of a digital identity computer according to embodiments.

FIG. 3 shows a block diagram of a processing network computer 300 according to embodiments. The processing network computer 300 may comprise a processor 302, which may be coupled to a memory 304, a network interface 306, and a computer readable medium 308.

The memory 304 may contain encryption keys such as plaintext symmetric keys, encrypted symmetric keys, encrypted data associated with a plurality of users, public encryption keys, etc. The memory 304 may be coupled to the processor 302 internally or externally (e.g., via cloud-based data storage), and may comprise any combination of volatile and/or non-volatile memory such as RAM, DRAM, ROM, flash, or any other suitable memory device.

The network interface 306 may include an interface that can allow the processing network computer 300 to communicate with external computers and/or devices. The network interface 306 may enable the processing network computer 300 to communicate data to and from another device such as a user device, a relying party computer, an identity computer, etc. Some examples of the network interface 306 may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface 306 may include Wi-Fi. Data transferred via the network interface 306 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 306 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 308 may comprise code, executable by the processor 302, for a method comprising: receiving, by a processing network computer from a relying party computer associated with a relying party, a request for data associated with a user operating a user device, and a public encryption key associated with the relying party ($pk_R$); generating, by a processing network computer, a second symmetric key ($K_2$); encrypting, by the processing network computer, the second symmetric key ($K_2$) with the public encryption key associated with the relying party ($pk_R$) to form an encrypted second symmetric key ($KEM_{R\_2}$); encrypting, by the processing network computer, first encrypted data associated with the user ($C_U$) with a second keystream ($F(K_2, N_2)$) to form first doubly encrypted data ($C_{UR}$), wherein the second keystream ($F(K_2, N_2)$) is generated using a keystream generation function (F) with the second symmetric key ($K_2$) and a second nonce ($N_2$) as input, wherein the first encrypted data associated with the user ($C_U$) comprises plaintext data associated with the user (M), and wherein the plaintext data associated with the user (M) is encrypted with a first keystream ($F(K_1, N_1)$) that is generated using the keystream generation function (F) with a first symmetric key ($K_1$) and a first nonce ($N_1$) as input; transmitting, by the processing network computer to the user device, an encrypted first symmetric key ($KEM_U$), the first nonce ($N_1$), the first doubly encrypted data ($C_{UR}$), and the public encryption key associated with the relying party ($pk_R$); receiving, by the processing network computer from the user device, an encrypted third symmetric key ($KEM_{R\_3}$), a third nonce ($N_3$), and second doubly encrypted data ($C_{RR}$), wherein the second doubly encrypted data ($C_{RR}$) was formed by encrypting second encrypted data associated with the user ($C_R$) with a third keystream ($F(K_3, N_3)$) that is generated using the keystream generation function (F) with a third symmetric key ($K_3$) and the third nonce ($N_3$) as input; and transmitting, by the processing network computer to the relying party computer, the encrypted second symmetric key ($KEM_{R\_2}$), the encrypted third symmetric key ($KEM_{R\_3}$), the second nonce ($N_2$), the third nonce ($N_3$), and the second doubly encrypted data ($C_{RR}$), wherein after the relying party computer receives the encrypted second symmetric key ($KEM_{R\_2}$), the encrypted third symmetric key ($KEM_{R\_3}$), the second nonce ($N_2$), the third nonce ($N_3$), and the second doubly encrypted data ($C_{RR}$) from the processing network computer, the relying party computer: decrypts the encrypted second symmetric key ($KEM_{R\_2}$) and the encrypted third symmetric key ($KEM_{R\_3}$) to obtain the second symmetric key ($K_2$) and the third symmetric key ($K_3$); and decrypts the second doubly encrypted data ($C_{RR}$) using the second symmetric key ($K_2$), the second nonce ($N_2$), the third symmetric key ($K_3$), and the third nonce ($N_3$) to obtain the plaintext data associated with the user (M).

The computer readable medium 308 may comprise a number of software modules including, but not limited to, an encryption module 308A, an identity management module 308B, and a communication module 308C.

The encryption module 308A may include any suitable encryption/decryption algorithms to encrypt and decrypt data in embodiments of the invention. Suitable data encryption/decryption algorithms may include RSA, DES, triple DES, AES, etc. Additional encryption algorithms usable by the encryption module 308A may include the use of stream ciphers. The encryption module 308A may store keystream generation functions of stream ciphers that are used to generate keystreams. The encryption module 308A may perform exclusive-OR operations using the keystream and plaintext data to encrypt the plaintext data. The encryption module 308A, in conjunction with the identity management module 308B, may store encryption keys that can be used with such encryption/decryption algorithms. The encryption module 308A may utilize symmetric or asymmetric encryption techniques to encrypt and/or verify data. Cryptographic keys that may be used by the encryption module 308A may be stored in the memory 304.

The identity management module 308B may comprise code that causes the processor 302 to manage identity accounts for a plurality of users. The identity management module 308B may store encrypted data of users in the memory 304. The identity management module 308B may retrieve encrypted data based on a user identifier received.

The communication module 308C may comprise code that causes the processor 302 to generate messages, forward messages, reformat messages, and/or otherwise communicate with other entities.

Figure 4:
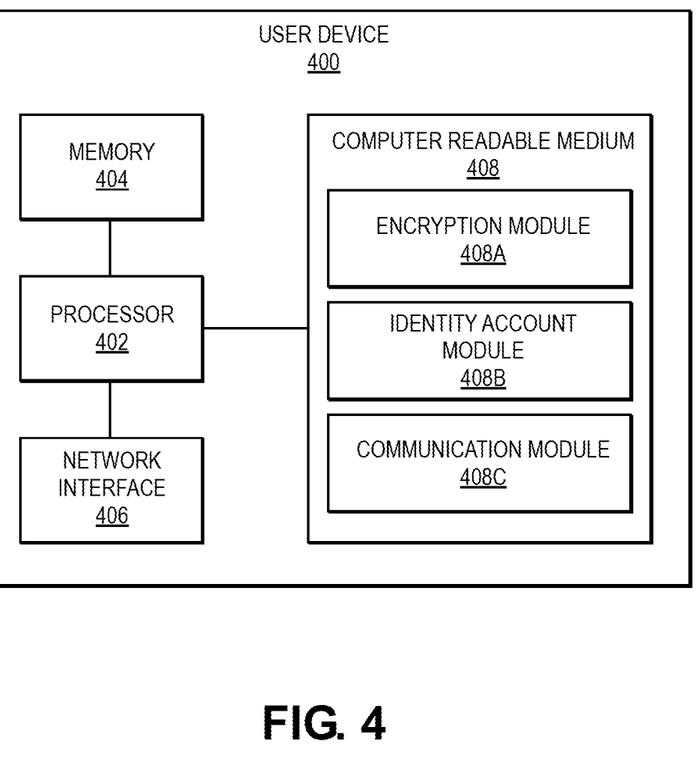
FIG. 4 shows a block diagram of a user device according to embodiments.

FIG. 4 shows a block diagram of a user device 400 according to embodiments. The user device 400 may comprise a processor 402, which may be coupled to a memory 404, a network interface 406, and a computer readable medium 408.

The memory 404 and the network interface 406 may have the same or different features to the previously described memory 304 and network interface 306.

The computer readable medium 408 may comprise code, executable by the processor 402, for a method comprising: receiving, by a user device from a processing network computer, an encrypted first symmetric key ($KEM_U$), a first nonce ($N_1$), first doubly encrypted data ($C_{UR}$), and a public encryption key associated with a relying party ($pk_R$); decrypting, by the user device, the encrypted first symmetric key ($KEM_U$) using a secret encrypted key associated with the user device ($sk_U$) to obtain a first symmetric key ($K_1$); decrypting, by the user device, the first doubly encrypted data ($C_{UR}$) using the first symmetric key ($K_1$) and the first nonce ($N_1$) to obtain second encrypted data associated with the user ($C_R$); generating, by the user device, a third symmetric key ($K_3$); encrypting, by the user device, the third symmetric key ($K_3$) using the public encryption key associated with the relying party ($pk_R$) to form an encrypted third symmetric key ($KEM_{R\_3}$); encrypting, by the user device, the second encrypted data associated with the user ($C_R$) with the with a third keystream ($F(K_3, N_3)$) to form second doubly encrypted data ($C_{RR}$), wherein the third keystream ($F(K_3, N_3)$) is generated using a keystream generation function (F) with the third symmetric key ($K_3$) and the third nonce ($N_3$); and transmitting, by the user device to the processing network computer, the encrypted third symmetric key ($KEM_{R\_3}$), the third nonce ($N_3$), and the second doubly encrypted data ($C_{RR}$), wherein the processing network computer transmits to a relying party computer operated by the relying party, the encrypted second symmetric key ($KEM_{R\_2}$), the encrypted third symmetric key ($KEM_{R\_3}$), the second nonce ($N_2$), the third nonce ($N_3$), and the second doubly encrypted data ($C_{RR}$), and wherein the relying party computer decrypts the encrypted second symmetric key ($KEM_{R\_2}$) and the encrypted third symmetric key ($KEM_{R\_3}$) to obtain the second symmetric key ($K_2$) and the third symmetric key ($K_3$); and decrypts the second doubly encrypted data ($C_{RR}$) using the second symmetric key ($K_2$), the second nonce ($N_2$), the third symmetric key ($K_3$), and the third nonce ($N_3$) to obtain the plaintext data associated with the user (M).

The computer readable medium 408 may comprise a number of software modules including, but not limited to, an encryption module 408A, an identity account module 408B, and a communication module 408C.

The encryption module 408A may include any suitable encryption/decryption algorithms to encrypt and decrypt data in embodiments of the invention. Suitable data encryption/decryption algorithms may include RSA, DES, triple DES, AES, etc. Additional encryption algorithms usable by the encryption module 408A may include the use of stream ciphers. The encryption module 408A may store keystream generation functions of stream ciphers that are used to generate keystreams. The encryption module 408A may perform exclusive-OR operations using the keystream and plaintext data to encrypt the plaintext data. The encryption module 408A may utilize symmetric or asymmetric encryption techniques to encrypt and/or verify data. Cryptographic keys that may be used by the encryption module 408A may be stored in the memory 404.

The identity account module 408B may comprise code that causes the processor 402 to maintain an identity account. The identity account module 408B may be used to provision identity data from an identity computer to an identity account maintained by a processing network computer. The identity account module 408B may store a user identifier which identifies the identity account at the processing network computer. The identity account module 408B The communication module 408C may comprise code that causes the processor 402 to generate messages, forward messages, reformate messages, and/or otherwise communicate with other entities.

Figure 5:
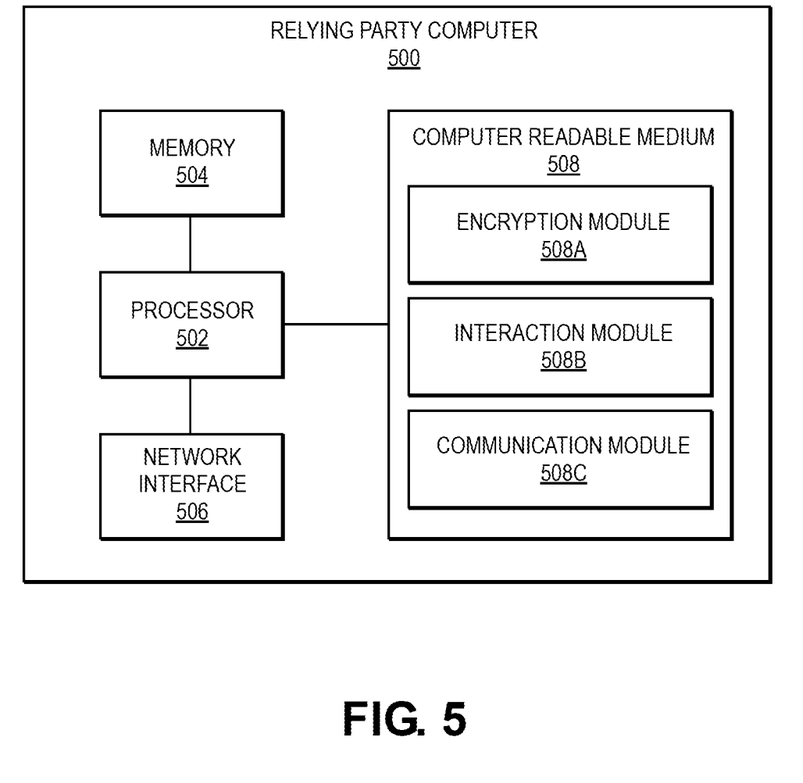
FIG. 5 shows a block diagram of a relying party computer according to embodiments.

FIG. 5 shows a block diagram of a relying party computer 500 according to embodiments. The relying party computer 500 may comprise a processor 502, which may be coupled to a memory 504, a network interface 506, and a computer readable medium 508.

The memory 504 and the network interface 506 may have the same or different features to the previously described memory 304 and network interface 306.

The computer readable medium 508 may comprise code, executable by the processor 502, for a method comprising: transmitting, by a relying party computer to a processing network computer, a request for data associated with a user operating a user device, and a public encryption key associated with the relying party ($pk_R$), wherein the processing network computer: generates a second symmetric key ($K_2$); encrypts the second symmetric key ($K_2$) with the public encryption key associated with the relying party ($pk_R$) to form an encrypted second symmetric key ($KEM_{R\_2}$); encrypts first encrypted data associated with the user ($C_U$) with a second keystream ($F(K_2, N_2)$) to form first doubly encrypted data ($C_{UR}$), wherein the second keystream ($F(K_2, N_2)$) is generated using a keystream generation function (F) with the second symmetric key ($K_2$) and a second nonce ($N_2$) as input, wherein the first encrypted data associated with the user ($C_U$) comprises plaintext data associated with the user (M), and wherein the plaintext data associated with the user (M) is encrypted with a first keystream ($F(K_1, N_1)$) that is generated using the keystream generation function (F) with a first symmetric key ($K_1$) and a first nonce ($N_1$) as input; transmits, to the user device, an encrypted first symmetric key ($KEM_U$), the first nonce ($N_1$), the first doubly encrypted data ($C_{UR}$), and the public encryption key associated with the relying party ($pk_R$); and receives, from the user device, an encrypted third symmetric key ($KEM_{R\_3}$), a third nonce ($N_3$), and second doubly encrypted data ($C_{RR}$), wherein the second doubly encrypted data ($C_{RR}$) was formed by encrypting second encrypted data associated with the user ($C_R$) with a third keystream ($F(K_3, N_3)$) that is generated using the keystream generation function (F) with a third symmetric key ($K_3$) and the third nonce ($N_3$) as input; receiving, by the relying party computer from the processing network computer, the encrypted second symmetric key ($KEM_{R\_2}$), the encrypted third symmetric key ($KEM_{R\_3}$), the second nonce ($N_2$), the third nonce ($N_3$), and the second doubly encrypted data ($C_{RR}$); decrypting, by the relying party computer, the encrypted second symmetric key ($KEM_{R\_2}$) and the encrypted third symmetric key ($KEM_{R\_3}$) to obtain the second symmetric key ($K_2$) and the third symmetric key ($K_3$); and decrypting, by the relying party computer, the second doubly encrypted data ($C_{RR}$) using the second symmetric key ($K_2$), the second nonce ($N_2$), the third symmetric key ($K_3$), and the third nonce ($N_3$) to obtain the plaintext data associated with the user (M).

The computer readable medium 508 may comprise a number of software modules including, but not limited to, an encryption module 508A, an interaction module 508B, and a communication module 508C.

The encryption module 508A may include any suitable encryption/decryption algorithms to encrypt and decrypt data in embodiments of the invention. Suitable data encryption/decryption algorithms may include RSA, DES, triple DES, AES, etc. Additional encryption algorithms usable by the encryption module 508A may include the use of stream ciphers. The encryption module 508A may store keystream generation functions of stream ciphers that are used to generate keystreams. The encryption module 508A may perform exclusive-OR operations using the keystream and plaintext data to encrypt the plaintext data. The encryption module 508A may utilize symmetric or asymmetric encryption techniques to encrypt and/or verify data. For example, the encryption module 508A can be used to verify a digital signature using a public encryption key. Cryptographic keys that may be used by the encryption module 508A may be stored in the memory 504.

The interaction module 508B may comprise code that causes the processor 502 to process interactions. The interaction module 508B can, in conjunction with the communication module 508C, allow the relying party computer 500 to process interactions with external devices.

The communication module 508C may comprise code that causes the processor 502 to generate messages, forward messages, reformate messages, and/or otherwise communicate with other entities.

Embodiments of the invention have a number of advantages. Embodiments of the invention can allow users to securely exchange encrypted data to external devices. Embodiments of the invention protect the data in transit by applying layers of encryption, such that only the intended recipient of the data can fully decrypt the encrypted data. For example, upon receiving doubly-encrypted data (e.g., $C_{UR}$), a user device may remove a user-layer of encryption to obtain second encrypted data (e.g., $C_R$). However, the user device cannot decrypt the second encrypted data, as the encryption is done using a symmetric key known only to the relying party and the processing network (e.g., $K_2$). The user device then adds the second relying party-layer of encryption (e.g., using the third keystream $F(K_3, N_3)$ to form $C_{RR}$) to the data before transmitting it to the processing network, The processing network is not able to remove both relying party-layers of encryption as it does not have access to both symmetric keys needed to decrypt the data (e.g., the processing network has access to $K_2$, but not to $K_3$). Further, embodiments of the invention provide for security against malicious entities in the identity exchange system. Naïve commutative encryption techniques can require both the user and the relying party to generate encryption keys using the same modulus, which requires them to share the prime factoring with each other. Embodiments of the invention use symmetric keys as inputs to a stream cipher that generates keystreams used to encrypt data, and thus do not require the user and the party to share prime factorings. These naïve techniques may pose a significant security threat, as a malicious party can infer the encryption key of the other party. Embodiments of the invention adapt standard and widely used cryptographic primitives to provide a secure data exchange method.

Other embodiments of the invention are also contemplated. For example, some embodiments can include a method comprising: transmitting, by a relying party computer operated by a relying party to a processing network computer, a request for data associated with a user operating a user device, and a public encryption key associated with the relying party ($pk_R$), wherein the processing network computer: generates a second symmetric key ($K_2$); encrypts the second symmetric key ($K_2$) with the public encryption key associated with the relying party ($pk_R$) to form an encrypted second symmetric key ($KEM_{R\_2}$); encrypts first encrypted data associated with the user ($C_U$) with a second keystream ($F(K_2, N_2)$) to form first doubly encrypted data ($C_{UR}$), wherein the second keystream ($F(K_2, N_2)$) is generated using a keystream generation function (F) with the second symmetric key ($K_2$) and a second nonce ($N_2$) as input, wherein the first encrypted data associated with the user ($C_U$) comprises plaintext data associated with the user (M), and wherein the plaintext data associated with the user (M) is encrypted with a first keystream ($F(K_1, N_1)$) that is generated using the keystream generation function (F) with a first symmetric key ($K_1$) and a first nonce ($N_1$) as input; transmits, to the user device, an encrypted first symmetric key ($KEM_U$), the first nonce ($N_1$), the first doubly encrypted data ($C_{UR}$), and the public encryption key associated with the relying party ($pk_R$); and receives, from the user device, an encrypted third symmetric key ($KEM_{R\_3}$), a third nonce ($N_3$), and second doubly encrypted data ($C_{RR}$), wherein the second doubly encrypted data ($C_{RR}$) was formed by encrypting second encrypted data associated with the user ($C_R$) with a third keystream ($F(K_3, N_3)$) that is generated using the keystream generation function (F) with a third symmetric key ($K_3$) and the third nonce ($N_3$) as input; receiving, by the relying party computer from the processing network computer, the encrypted second symmetric key ($KEM_{R\_2}$), the encrypted third symmetric key ($KEM_{R\_3}$), the second nonce ($N_2$), the third nonce ($N_3$), and the second doubly encrypted data ($C_{RR}$); decrypting, by the relying party computer, the encrypted second symmetric key ($KEM_{R\_2}$) and the encrypted third symmetric key ($KEM_{R\_3}$) to obtain the second symmetric key ($K_2$) and the third symmetric key ($K_3$); and decrypting, by the relying party computer, the second doubly encrypted data ($C_{RR}$) using the second symmetric key ($K_2$), the second nonce ($N_2$), the third symmetric key ($K_3$), and the third nonce ($N_3$) to obtain the plaintext data associated with the user (M).

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by a processing network computer from a relying party computer associated with a relying party, a request for data associated with a user operating a user device, and a public encryption key associated with the relying party;
   generating, by the processing network computer, a second symmetric key;
   encrypting, by the processing network computer, the second symmetric key with the public encryption key associated with the relying party to form an encrypted second symmetric key;
   encrypting, by the processing network computer, first encrypted data associated with the user with a second keystream to form first doubly encrypted data, wherein the second keystream is generated using a keystream generation function with the second symmetric key and a second nonce as input, wherein the first encrypted data associated with the user comprises plaintext data associated with the user, and wherein the plaintext data associated with the user is encrypted with a first keystream that is generated using the keystream generation function with a first symmetric key and a first nonce as input;
   transmitting, by the processing network computer to the user device, an encrypted first symmetric key, the first nonce, the first doubly encrypted data, and the public encryption key associated with the relying party;
   receiving, by the processing network computer from the user device, an encrypted third symmetric key, a third nonce, and second doubly encrypted data, wherein the second doubly encrypted data was formed by encrypting second encrypted data associated with the user with a third keystream that is generated using the keystream generation function with a third symmetric key and the third nonce as input; and
   transmitting, by the processing network computer to the relying party computer, the encrypted second symmetric key, the encrypted third symmetric key, the second nonce, the third nonce, and the second doubly encrypted data, wherein after the relying party computer receives the encrypted second symmetric key, the encrypted third symmetric key, the second nonce, the third nonce, and the second doubly encrypted data from the processing network computer, the relying party computer:
   decrypts the encrypted second symmetric key and the encrypted third symmetric key to obtain the second symmetric key and the third symmetric key; and
   decrypts the second doubly encrypted data using the second symmetric key, the second nonce, the third symmetric key, and the third nonce to obtain the plaintext data associated with the user.

2. The method of claim 1, wherein the keystream generation function implements a counter mode stream cipher.

3. The method of claim 1, wherein encrypting the first encrypted data associated with the user with the second keystream, encrypting the plaintext data with the first keystream, and encrypting the second encrypted data associated with the user with the third keystream comprises performing an XOR on the data to be encrypted with the respective keystream.

4. The method of claim 1, wherein the data associated with the user operating the user device comprises identity data of the user.

5. The method of claim 1, wherein the first symmetric key is generated by an identity computer and is encrypted by the identity computer to form the encrypted first symmetric key using a public encryption key associated with the user.

6. The method of claim 1, further comprising, before receiving, by the processing network computer from the relying party computer associated with the relying party, the request for data associated with the user operating the user device, and the public encryption key associated with the relying party:
   receiving, by the processing network computer from an identity computer, the first symmetric key, the encrypted first symmetric key, and the first nonce.

7. The method of claim 1, wherein the request for data associated with the user operating the user device comprises a user identifier, and wherein the processing network computer retrieves the first encrypted data associated with the user based on the user identifier.

8. The method of claim 1, wherein after the user device receives the encrypted first symmetric key, the first nonce, the first doubly encrypted data, and the public encryption key associated with the relying party from the processing network computer, the user device:
   decrypts the encrypted first symmetric key using a secret encrypted key associated with the user device;
   decrypts the first doubly encrypted data using the first symmetric key and the first nonce to obtain the second encrypted data associated with the user;
   generates the third symmetric key;
   encrypts the third symmetric key using the public encryption key associated with the relying party to form the encrypted third symmetric key; and
   encrypts the second encrypted data associated with the user with the third keystream that is generated using the keystream generation function with the third symmetric key and the third nonce to obtain the second doubly encrypted data.

9. The method of claim 1, wherein the plaintext data associated with the user further comprises a digital signature associated with the user device.

10. The method of claim 1, wherein the user device is a mobile device.

11. The method of claim 1, wherein the request for data associated with the user operating the user device is in an interaction.

12. The method of claim 1, wherein the encrypted first symmetric key, the encrypted second symmetric key, and the encrypted third symmetric key are formed using a public-key encryption scheme.

13. The method of claim 1, wherein the plaintext data associated with the user can be obtained by performing an XOR with the second doubly encrypted data and the second keystream and the third keystream.

14. The method of claim 1, wherein the plaintext data associated with the user is provisioned by an identity computer.

15. A processing network computer comprising:
a processor; and
a non-transitory computer readable medium comprising instructions executable by the processor to perform operations including:
receiving, from a relying party computer associated with a relying party, a request for data associated with a user operating a user device, and a public encryption key associated with the relying party;
generating a second symmetric key;
encrypting the second symmetric key with the public encryption key associated with the relying party to form an encrypted second symmetric key;
encrypting first encrypted data associated with the user with a second keystream to form first doubly encrypted data, wherein the second keystream is generated using a keystream generation function with the second symmetric key and a second nonce as input, wherein the first encrypted data associated with the user comprises plaintext data associated with the user, and wherein the plaintext data associated with the user is encrypted with a first keystream that is generated using the keystream generation function with a first symmetric key and a first nonce as input;
transmitting, to the user device, an encrypted first symmetric key, the first nonce, the first doubly encrypted data, and the public encryption key associated with the relying party;
receiving, from the user device, an encrypted third symmetric key, a third nonce, and second doubly encrypted data, wherein the second doubly encrypted data was formed by encrypting second encrypted data associated with the user with a third keystream that is generated using the keystream generation function with a third symmetric key and the third nonce as input; and
transmitting, to the relying party computer, the encrypted second symmetric key, the encrypted third symmetric key, the second nonce, the third nonce, and the second doubly encrypted data, wherein after the relying party computer receives the encrypted second symmetric key, the encrypted third symmetric key, the second nonce, the third nonce, and the second doubly encrypted data from the processing network computer, the relying party computer:
decrypts the encrypted second symmetric key and the encrypted third symmetric key to obtain the second symmetric key and the third symmetric key; and
decrypts the second doubly encrypted data using the second symmetric key, the second nonce, the third symmetric key, and the third nonce to obtain the plaintext data associated with the user.

16. The processing network computer of claim 15, wherein the keystream generation function implements a counter mode stream cipher.

17. The processing network computer of claim 15, wherein the operations further include, before receiving, from the relying party computer associated with the relying party, the request for data associated with the user operating the user device, and the public encryption key associated with the relying party:
receiving, from an identity computer, the first symmetric key, the encrypted first symmetric key, and the first nonce.

18. The processing network computer of claim 15, wherein encrypting the first encrypted data associated with the user with the second keystream, encrypting the plaintext data with the first keystream, and encrypting the second encrypted data associated with the user with the third keystream comprises performing an XOR on the data to be encrypted with the respective keystream.

19. A method comprising:
receiving, by a user device operated by a user from a processing network computer, an encrypted first symmetric key, a first nonce, first doubly encrypted data, and a public encryption key associated with a relying party;
decrypting, by the user device, the encrypted first symmetric key using a secret encrypted key associated with the user device to obtain a first symmetric key;
decrypting, by the user device, the first doubly encrypted data using the first symmetric key and the first nonce to obtain second encrypted data associated with the user;
generating, by the user device, a third symmetric key;
encrypting, by the user device, the third symmetric key using the public encryption key associated with the relying party to form an encrypted third symmetric key;
encrypting, by the user device, the second encrypted data associated with the user with a third keystream to form second doubly encrypted data, wherein the third keystream is generated using a keystream generation function with the third symmetric key and a third nonce; and
transmitting, by the user device to the processing network computer, the encrypted third symmetric key, the third nonce, and the second doubly encrypted data, wherein the processing network computer:
transmits, to a relying party computer operated by the relying party, an encrypted second symmetric key, the encrypted third symmetric key, a second nonce, the third nonce, and the second doubly encrypted data, wherein the relying party computer:
decrypts the encrypted second symmetric key and the encrypted third symmetric key to obtain a second symmetric key and the third symmetric key; and
decrypts the second doubly encrypted data using the second symmetric key, the second nonce, the third symmetric key, and the third nonce to obtain plaintext data associated with the user.

20. The method of claim 19, wherein the keystream generation function implements a counter mode stream cipher.

* * * * *